(12) United States Patent
Kishbaugh et al.

(10) Patent No.: US 7,665,719 B2
(45) Date of Patent: Feb. 23, 2010

(54) FOOD PREPARATION BOARD

(75) Inventors: Ronald G. Kishbaugh, Elmira, NY (US); Letesa Isler, Waukegan, IL (US); Richard Watson, Norwell, MA (US); Rebecca Taylor, Providence, RI (US)

(73) Assignee: WKI Holding Company, Inc., Rosemont, IL (US)

( * ) Notice: Subject to any disclaimer, the term of this patent is extended or adjusted under 35 U.S.C. 154(b) by 1110 days.

(21) Appl. No.: 10/993,042

(22) Filed: Nov. 19, 2004

(65) Prior Publication Data

US 2006/0108730 A1    May 25, 2006

(51) Int. Cl.
*B23Q 3/00* (2006.01)
(52) U.S. Cl. .................. 269/289 R; 269/302.1
(58) Field of Classification Search ............ 269/289 R, 269/302.1, 286; 33/476, 709
See application file for complete search history.

(56) References Cited

U.S. PATENT DOCUMENTS

| 797,644 | A | * | 8/1905 | Trahern ................ 269/302.1 |
| 3,347,179 | A | * | 10/1967 | Haidinyak .............. 269/296 |
| D227,642 | S | | 7/1973 | Daenen |
| 4,100,676 | A | | 7/1978 | Ferguson |
| 4,116,426 | A | | 9/1978 | Kessler |
| 5,386,654 | A | * | 2/1995 | Kroenke ................ 269/307 |
| 5,860,641 | A | | 1/1999 | Heath |
| D435,064 | S | | 12/2000 | Nicholson |
| 6,715,748 | B2 | | 4/2004 | Thompson et al. |

FOREIGN PATENT DOCUMENTS

| JP | 09-056608 | 3/1997 |
| JP | 10-276918 | 10/1998 |

* cited by examiner

*Primary Examiner*—Lee D Wilson
(74) *Attorney, Agent, or Firm*—McDermott Will & Emery LLP

(57) ABSTRACT

The present invention provides a food preparation board with multiple and distinct measurement zones. The food preparation board comprises a work surface that is provided for preparation of a food item thereon, and is sized to receive at least a portion of the food item. A rest surface is located opposite the work surface. A first measurement zone is defined by a first portion of the work surface. The first measurement zone is comprised of a first plurality of measurement indicia corresponding to a first measurement scale. A second measurement zone is defined by a distinct second portion of the work surface, the second measurement zone is comprised of a second plurality of measurement indicia corresponding to a second measurement scale. The second measurement scale is different than the first measurement scale.

18 Claims, 3 Drawing Sheets

FOOD PREPARATION BOARD

TECHNICAL FIELD

This invention relates generally to food preparation boards, and more particularly, to food preparation boards with multiple and distinct measurement zones.

BACKGROUND OF THE INVENTION

Food preparation boards are generally used in combination with kitchen utensils to facilitate the preparation of food-related items. There is often a need to cut or otherwise form food items to predetermined sizes while cooking. The present invention seeks to overcome certain of the limitations and other drawbacks of the prior art, and to provide new aspects and advantages not heretofore available.

SUMMARY OF THE INVENTION

The present invention provides a food preparation board with a plurality of distinct measurement zones. The food preparation board comprises a work surface for preparation of a food item thereon and that is sized to receive at least a portion of the food item. A rest surface is located opposite the work surface. A first measurement zone is defined by a first portion of the work surface. The first measurement zone is comprised of a first plurality of measurement indicia corresponding to a first measurement scale. A second measurement zone is defined by a distinct second portion of the work surface. The second measurement zone is comprised of a second plurality of measurement indicia corresponding to a second measurement scale. The second measurement scale is different than the first measurement scale.

According to another aspect of the present invention, a first measurement zone comprises a first plurality of measurement indicia disposed at predetermined positions along a width and a length of a first portion of the work surface. Accordingly, a first measurement scale is defined in at least two directions. A second measurement zone comprises a second plurality of measurement indicia disposed at predetermined positions along a width and a length of a second portion of the work surface. Thus, a second measurement scale is defined in at least two directions. The second measurement scale is different than the first measurement scale.

According to another aspect of the present invention, the food preparation board has a third measurement zone. The third measurement zone comprises a plurality of concentric circle indicia. Each of the concentric circle indicia is spaced a predetermined distance one from another of the concentric circle indicia to define a third measurement scale for measuring circumferences.

According to another aspect of the present invention, a food preparation board having a work surface and a rest surface is provided. The food preparation board is comprised of a first measurement zone and a second measurement zone. The first measurement zone is defined by a first portion of the work surface. The fist measurement zone is comprised of a first plurality of measurement indicia disposed at predetermined positions along the width and length of the first portion to define a first measurement scale in at least two directions. The second measurement zone is defined by a distinct second portion of the work surface. The second measurement zone is comprised of a plurality of concentric circle indicia for circumferential measurement. The concentric circle indicia are spaced a predetermined distance one from the other.

According to yet another aspect of the present invention, a food preparation board having a work surface and a rest surface is provided. The food preparation board is comprised of a first measurement zone and a second measurement zone. The first measurement zone is defined by a first portion of the work surface. The first measurement zone is comprised of a first plurality of measurement indicia disposed at predetermined positions along a width and length of the first portion to define a first measurement scale in at least two directions. The second measurement zone is defined by a distinct second portion of the work surface. The second measurement zone is comprised of at least one geometric shape.

According to yet another embodiment of the present invention, the food preparation board is made from a transparent material, and at least one of the first and second plurality of measurement indicia is disposed on the rest surface.

According to still another aspect of the present invention, the food preparation board is an overlay for an existing food preparation board.

These and other objects and advantages will be made apparent from the following discussion of a preferred embodiment of the invention and the referenced drawings, as well as the appended claims.

BRIEF DESCRIPTION OF THE DRAWINGS

The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF A PREFERRED EMBODIMENT

Figure 1:
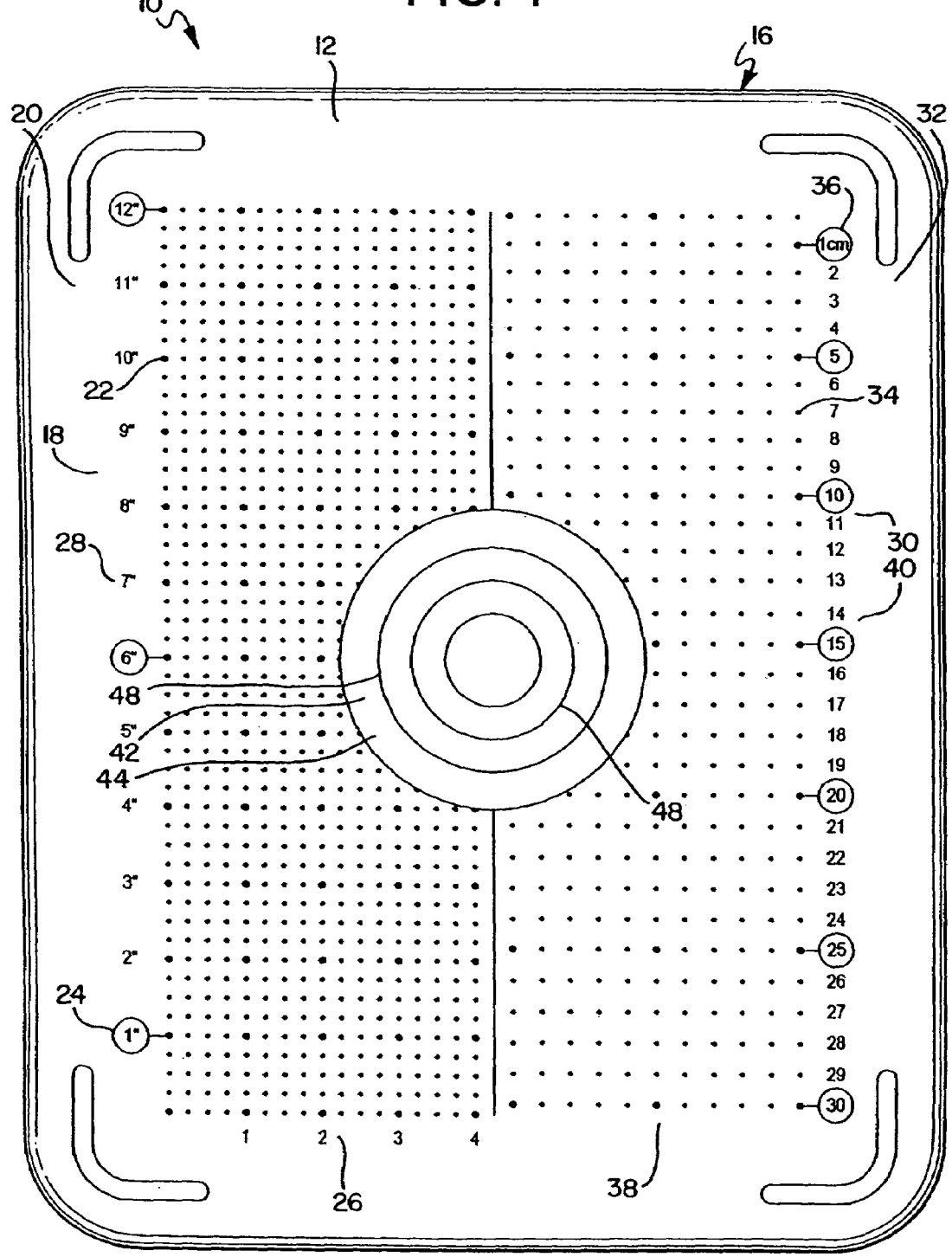
FIG. 1 is a top plan view of a preparation board according to one embodiment of the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 2:
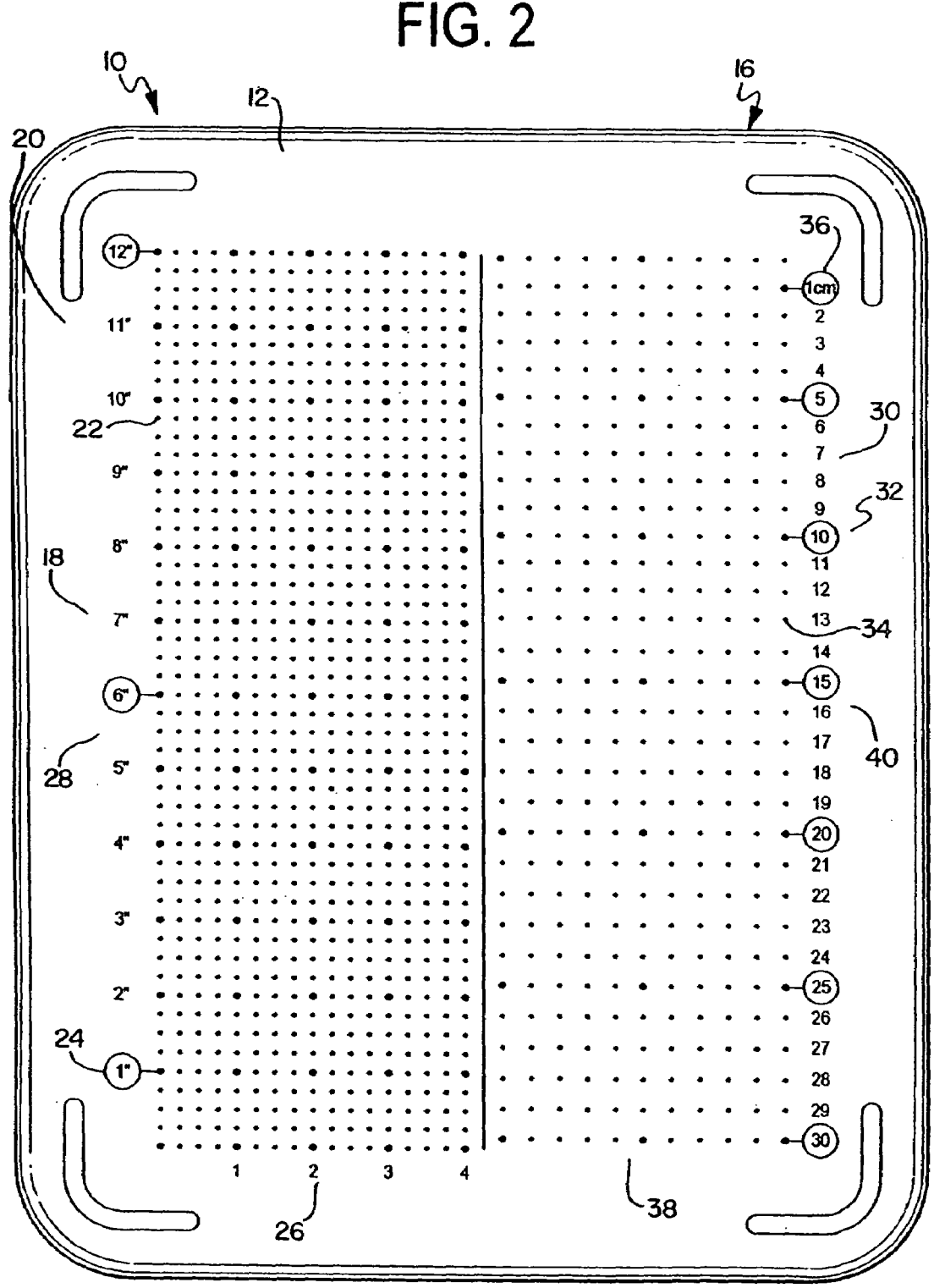
FIG. 2 is a top plan view of a preparation board according to another embodiment of the present invention; and, FIG. 3 is a top plan view of a preparation board according to still another embodiment of the present invention.
Figure 3:
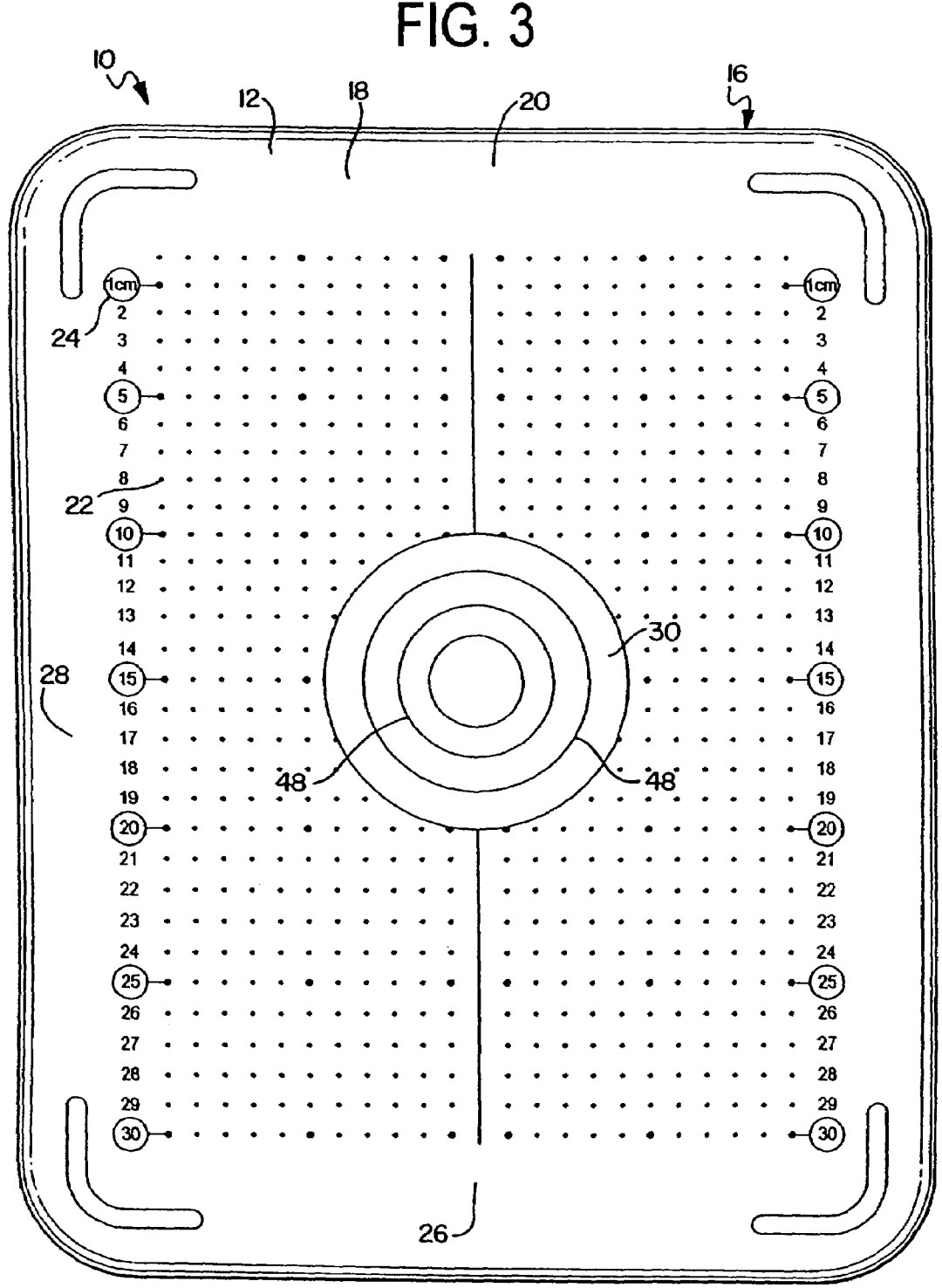

Referring now in detail to FIGS. 1-3, there is shown generally a food preparation board 10 according to the present invention. The food preparation board 10 of the present invention is preferably formed from glass such as that used in connection with products commercially sold under the Pyrex® brand name. However, the food preparation board 10 can be formed of any material, including wood, polymer, or other materials suitable for food preparation. Furthermore, the food preparation board 10 can be of any suitable thickness and configured to conform to any geometric shape without departing from the present invention. For example, the food preparation board may be configured as a square, rectangle, circle, oval or any other aesthetically or functionally suitable geometric shape.

As may be seen in FIGS. 1-3, the food preparation board 10 generally comprises a work surface 12 upon which a food item may be prepared (e.g., cut, chopped, diced, shaped, etc.). According to the present invention, the work surface 12 is sufficiently sized to receive at least a portion of the food item.

The food preparation board 10 further has a rest surface 16 disposed opposite the work surface 12. The rest surface 12 may be generally flat such that the preparation board 10 rests substantially directly on a work surface such as countertop. Alternatively, the rest surface 12 may include legs or pads upon which the preparation board 10 may sit.

According to another embodiment of the present invention, the preparation board 10 may be an overlay for an existing food preparation board or work surface. According to such an embodiment, the preparation board 10 is made from a flexible material, and may be retrofitted to the existing board or work surface.

As may be seen in FIGS. 1-3, the preparation board 10 of the present invention includes a first measurement zone 18 and a second measurement zone 30. The first measurement zone 18 is defined by a first portion 20 of the work surface 12. The first measurement zone 18 includes a first plurality of measurement indicia 22 corresponding to a first measurement scale 24. The first plurality of measurement indicia 22 are disposed at predetermined positions along a width 26 and a length 28 of the first portion 20 of the work surface 12. It is preferable that the first measurement scale 24 be defined in at least two directions of the work surface 12; for example, along the width and length of the first portion 20 of the work surface. Furthermore, it is contemplated that the first plurality of measurement indicia 22 can be a grid-like pattern of dots, as illustrated in FIG. 1, or any other pattern that would accurately correspond to the denominations of the first measurement scale 24, as would be apparent to one of ordinary skill in the art.

The second measurement zone 30 is defined by a distinct second portion 32 of the work surface 12. Preferably, the first and second measurement zones 18, 30 do not overlap on the work surface 12 of the preparation board 10. The second measurement zone 30 comprises a second plurality of measurement indicia 34 corresponding to a second measurement scale 36. The second measurement scale 36 is different than the first measurement scale 24. For example, the first measurement scale 24 can be comprised of incremental units of the English Customary measurement system (e.g., quarter-inches, half-inches and inches), while the second measurement scale 36 can be comprised of incremental units of the metric system (e.g., millimeters and centimeters).

Furthermore, it is preferable that the second plurality of measurement indicia 34 be disposed at predetermined positions along a width 38 and a length 40 of the second portion 32 of the work surface 12 to define the second measurement scale 36 in at least two directions. The second plurality of measurement indicia 34 can also be a grid-like pattern of dots, as shown in FIG. 1, or any other pattern that accurately corresponds with the denominations of the second measurement scale 36.

According to one embodiment of the present invention shown in FIG. 1, a third measurement zone 42 is provided. The third measurement zone 42 is defined by a third distinct portion 44 of the work surface 12, and is comprised of at least one geometric shape 46 imprinted thereon. As shown in FIG. 1, the geometric shape is preferably a plurality of concentric circle indicia 48. The concentric circle indicia 48 are provided for the circumferential measurement of a food item and are spaced at predetermined distances one from the other. While this embodiment preferably employs a plurality of concentric circle indicia 48, it is also contemplated by the present invention that the geometric shape of the third measurement zone 42 can be any closed curve, polygon, spiral, or any other shape suitable for measuring a predetermined perimeter size or sizes of a predetermined shape.

While the embodiment of the food preparation board 10 just described includes all three of the first, second, and third measurement zones 18, 30, 42, all three zones 18, 30, 42 need not be present in the present invention; any two of the first, second and third measurement zones 18, 30, 42 can be combined to form the present invention. For example, FIG. 2 shows one embodiment of the preparation board 10 having only two distinct zones. The first measurement zone 18 is comprised of a first plurality of measurement indicia 22 disposed at predetermined positions along a width 26 and a length 28 of a first portion 20 of the work surface 12 to define a first measurement scale 24 in at least two directions. The second measurement zone 30 is comprised of a second plurality of measurement indicia 34 disposed at predetermined positions along a width 38 and a length 40 of a second portion 32 of the work surface 12 to define a second measurement scale 36 in at least two directions.

FIG. 3 illustrates another embodiment of the food preparation board 10 having only two distinct zones. The first measurement zone 18 is comprised of a first plurality of measurement indicia 22 disposed at predetermined positions along a width 26 and a length 28 of a first portion 20 of the work surface 12 to define a first measurement scale 24 in at least two directions. The second measurement zone 30 is comprised of a plurality of concentric circle indicia 48 spaced at a predetermined distance one from the other.

As discussed above, the food preparation board 10 is preferably made from a transparent material such as glass. In such an embodiment, one or all of the measurement and/or concentric circle indicia 18, 30, 42 can be disposed on the rest surface 16 of the preparation board 10. This placement of the relevant indicia prevents the measurement and/or concentric circle indicia 18, 30, 42 from wearing or being scratched when sharp utensils are used to prepare the food item on the work surface 12 of the food preparation board 10. However, it is contemplated that the measurement and/or concentric circle indicia 18, 30, 42 can be disposed on the work surface 12 without departing from the present invention.

The measurement scales are preferably denominated in accordance with incremental units of the English Customary and metric systems. However, it is contemplated that any suitable measurement system may be used in connection with the food preparation without departing from the present invention.

As used herein, the terms "first," "second," "third," etc. are for illustrative purposes only and are not intended to limit the embodiments in any way. Additionally, the term "plurality" as used herein is intended to indicate any number greater than one, either disjunctively or conjunctively as necessary, up to an infinite number.

It should be emphasized that the above-described embodiments of the present invention, particularly any "preferred" embodiments, are merely examples of implementations to provide a clear understanding of the principles of the invention. Numerous variations and modifications come to mind without significantly departing from the spirit and principles of the invention, and the scope of protection is limited only by the scope of the accompanying claims. All such modifications are intended to be included herein and fall within the scope of this disclosure and the present invention and are intended to be protected by the following claims. For example, even though the examples given involve using the preparation board 10 for preparing food items, the preparation board 10 can also be used in such settings as a laboratory to separate and measure amounts of chemical powders and the like.

What is claimed is:

1. A food preparation board comprising:
   a smooth work surface sized to receive at least a portion of a food item and being provided for preparation of the food item thereon;
   a rest surface opposite the work surface;
   a first measurement zone defined by a first portion of the work surface, the first measurement zone comprising a first plurality of measurement indicia corresponding to a first measurement scale; and,
   a second measurement zone being defined by a distinct second portion of the work surface, the second measurement zone comprising a second plurality of measurement indicia corresponding to a second measurement scale, the second measurement scale being different than the first measurement scale.

2. The food preparation board of claim 1 further comprising a third measurement zone comprising a plurality of concentric circle indicia, each of the concentric circle indicia being spaced a predetermined distance one from the other, and being provided for circumferential measurement of a food item.

3. The food preparation board of claim 1 wherein the first and second plurality of measurement indicia are disposed on the work surface.

4. The food preparation board of claim 1 wherein the board is made from a transparent material and at least one of the first and second plurality of measurement indicia is disposed on the rest surface.

5. The food preparation board of claim 1 wherein the food preparation board is formed of a material selected from the group of wood, polymer and glass.

6. The food preparation board of claim 1 wherein the first measurement scale is denominated in accordance with the English Customary measurement system and the second measurement scale is denominated in accordance with the metric system.

7. The food preparation board of claim 1 wherein the food preparation board is an overlay for an existing food preparation board.

8. A food preparation board comprising:
   a smooth work surface sized to receive at least a portion of a food item and being provided for preparation of the food item thereon;
   a rest surface opposite the work surface;
   a first measurement zone defined by a first portion of the work surface, the first measurement zone comprising a first plurality of measurement indicia disposed at predetermined positions along a width and length of the first portion of the work surface and defining a first measurement scale in at least two directions; and,
   a second measurement zone defined by a distinct second portion of the work surface, the second measurement zone comprising a second plurality of measurement indicia disposed at predetermined positions along a width and length of the second portion and defining a second measurement scale in at least two directions, the second measurement scale being different than the first measurement scale.

9. The food preparation board of claim 8 further comprising a third measurement zone comprising a plurality of concentric circle indicia, each of the concentric circle indicia being spaced a predetermined distance one from the other, and being provided for circumferential measurement of a food item.

10. The food preparation board of claim 8 wherein the first and second plurality of measurement indicia are disposed on the work surface.

11. The food preparation board of claim 8 wherein the board is made from a transparent material and at least one of the first and second plurality of measurement indicia is disposed on the rest surface.

12. The food preparation board of claim 8 wherein the food preparation board is formed of a material selected from the group of wood, polymer and glass.

13. The food preparation board of claim 8 wherein the first measurement scale is denominated in accordance with the English Customary measurement system and the second measurement scale is denominated in accordance with the metric system.

14. The food preparation board of claim 8 wherein the food preparation board is an overlay for an existing food preparation board.

15. A food preparation board having a smooth work surface and a rest surface, the food preparation board comprising:
   a first measurement zone defined by a first portion of the work surface, the first measurement zone comprising a first plurality of measurement indicia disposed at predetermined positions along the width and length of the first portion to define a first measurement scale in at least two directions; and,
   a second measurement zone defined by a distinct second portion of the work surface, the second measurement zone comprising a plurality of concentric circle indicia, each of the plurality of concentric circle indicia being spaced a predetermined distance one from the other, and being provided for circumferential measurement of a food item.

16. The food preparation board of claim 15 further comprising a third measurement zone defined by a third portion of the work surface, the third measurement zone comprising a second plurality of measurement indicia disposed at predetermined positions along the width and length of the third portion to define a second measurement scale in at least two directions, wherein the second measurement scale is different from the first measurement scale.

17. The food preparation board of claim 15 wherein the food preparation board is an overlay for an existing food preparation board.

18. The food preparation board of claim 15 wherein the board is made from a transparent material and at least one of the first plurality of measurement indicia and the plurality of concentric circle indicia is disposed on the rest surface.

* * * * *